Patented May 5, 1925.

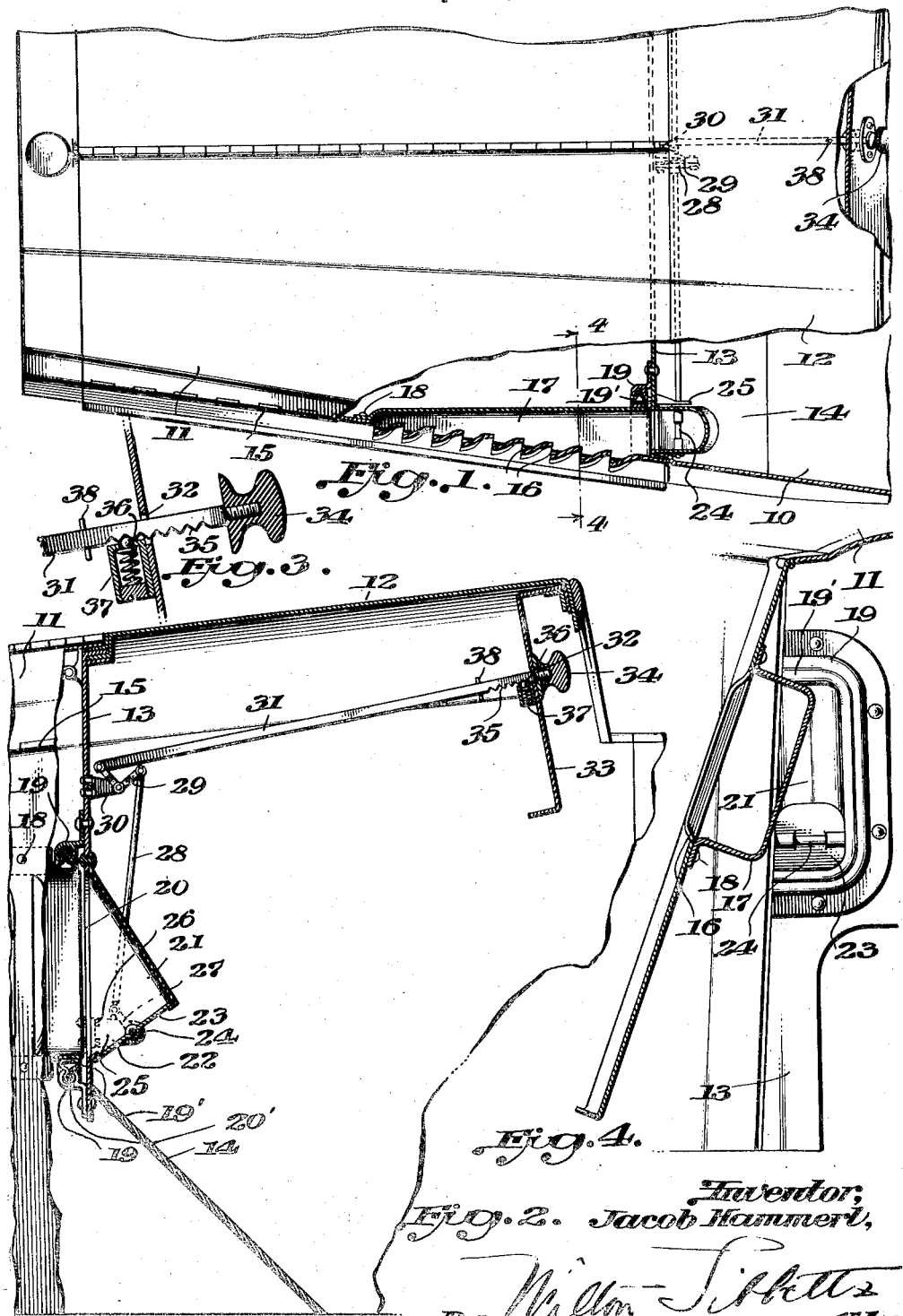

1,536,340

UNITED STATES PATENT OFFICE.

JACOB HAMMERL, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed September 25, 1919. Serial No. 326,157.

*To all whom it may concern:*

Be it known that I, JACOB HAMMERL, a citizen of the United States, and resident of Detroit, Wayne County, State of Michigan, have invented certain new and useful Improvements in Motor Vehicles, of which the following is a specification.

This invention relates to motor vehicles and more particularly to ventilating means therefor.

In the usual type of motor vehicles the space in the rear of the engine and hood or beneath the cowl of the vehicle becomes heated to a considerable degree by the engine and in warm weather this heat is objectionable to the driver or persons occupying the space in the front of the vehicle.

The present invention has for its object to overcome this condition by ventilating the front portion of the vehicle or the portion disposed beneath the cowl.

This object is attained in the present embodiment of the invention providing means for conducting air to the interior or front of the car or vehicle or to the space beneath the cowl, means also being provided for regulating the amount of air admitted to this portion of the vehicle.

I have illustrated one embodiment of my invention in the accompanying drawing and in this drawing—

Fig. 1 is a top plan view, partly broken away and partly in section, of the front end portion of a motor vehicle;

Fig. 2 is an enlarged view in side elevation, partly broken away and showing portions of the vehicle in section;

Fig. 3 is a sectional view still further enlarged, illustrating the automatic locking means for the adjusting member which controls the admission of the air; and Fig. 4 is a transverse sectional view showing the hinged side of the hood in various positions of adjustment, taken substantially on the line 4—4 of Fig. 1.

The front end portion of a motor vehicle is illustrated in the drawing, this portion comprising a body portion 10, a hood 11, a cowl 12 extending between the hood and the main body portion, a dash 13 disposed in the rear of the hood and a foot board 14.

The hood 11 is provided with side members hinged as shown at 15 and the rear portion of the hood is provided with forwardly opening louvers 16, these louvers permitting the admission of air to the ventilating means hereinafter described.

A conduit 17, preferably formed of sheet metal, is secured to the portion of the hood in which are located the louvers 16 by any suitable means such as rivets 18 and the rear end of this conduit is secured against vibration by means of a bracket 19 carried by the dash and shaped to conform to the conduit section. The general form and shape of the conduit is illustrated in Figures 1 and 2, the conduit being tapered longitudinally and being open at the rear. The bracket 19 has clamped therein a portion 19' of a tubing, preferably formed of rubber, a rod 20' retaining the tubing in the bracket. This tubing forms a cushion for the exit end of the conduit and prevents rattling or vibration of the conduit and hinged side of the hood 11.

The dash 13 is provided with an opening 20 disposed in alignment with the rear open end of the conduit 17 and a deflecting member 21 is secured to the dash and surrounds the opening 20, this hood having an opening 22 through which the air is admitted to the portion of the vehicle beneath the cowl 12.

In order to regulate the amount of air admitted through the conduit 17 and deflecting member 21, I have provided a gate 23 which is carried by a transverse pivot rod 24 which in turn is carried by the side walls of the deflecting member or hood 21 and by a bracket 25 which is suitably secured to the dash 13 as shown at 26.

Suitable means is provided for swinging the gate on its pivot and for retaining the gate in adjusted position. This means comprises an arm 27 secured at one end to the rod 24, which extends transversely across the vehicle, and the arm 27 is connected at its opposite end to a link 28 which in turn is connected to a bell crank lever 29 pivoted on a bracket 30 secured to the dash 13. The opposite end of the bell crank lever has pivotally connected therewith a longitudinally adjustable rod 31 which extends rearwardly, passing through an aperture 32 in the instrument board 33.

A handle 34 is secured to the rear end of the rod 31 and the rod is provided adjacent its rear end with a series of serrations 35 which are adapted to be engaged by a spring pressed plunger 36, which is carried by socket 37 secured to the instrument board.

A stop 38 is provided on the rod 31 adjacent the serrations 35 to limit the rearward movement of this rod.

Having described the construction of my improved ventilating means, I will now briefly set forth the operation of this mechanism.

When the motor car is moving forwardly the air will pass through the forwardly opening louvers 16 into the conduit 17 and from the conduit through the opening in the dash into the deflecting member 21. By manipulating the rod 31 the gate 23 may be opened to any desired extent thereby admitting the air to the portion of the vehicle beneath the cowl 12. The regulating means is automatically held in any desired position of adjustment by means of a spring pressed plunger as described above.

While I have in the above specification described one specific embodiment of my invention, it is to be understood that the invention is capable of modification and that modifications and changes may be made in the construction and arrangement of the various cooperating parts without departing from the spirit and scope of the invention as expressed in the following claims.

What I claim and desire to secure by Letters Patent is:

1. In a motor vehicle, a pivoted hood having forwardly opening side louvers, a dash having an opening therein and a conduit for conducting the air admitted through said louvers to the opening in said dash.

2. In a motor vehicle, a hood having forwardly opening side louvers, a dash having an opening therein, a conduit for conducting the air admitted through the louvers from said louvers to the opening in said dash, and means carried by said dash and engaging said conduit for supporting said conduit and preventing vibration thereof.

3. In a motor vehicle, a dash having an opening therein, a hood having a hinged side member provided with lateral openings, a conduit carried by said side member for conducting the air rearwardly from the openings therein through the opening in the dash, and a support on said dash for engaging and supporting the conduit when the side member is in closed position.

4. In a motor vehicle, a dash having an opening therein, a hood having a hinged side member provided with openings therein, a conduit carried by said side member for conducting air rearwardly from the openings in the side member through the opening in the dash, and a cushioning member carried by said dash for engaging and supporting the conduit when the side member is in closed position.

5. In a motor vehicle, a dash having an opening therein, a hood having a hinged side member provided with openings therein, a conduit carried by said hood for conducting air rearwardly from the openings in the side member to the opening in the dash, and an outwardly opening supporting member carried by said dash for engaging the conduit when the hinged side member of the hood is in closed position but permitting the swinging of said side member outwardly about its hinge.

6. In a motor vehicle, in combination, a dash having an opening into the vehicle body, a hood movable relatively to the dash and having an air opening, and means carried by the movable hood for conducting air from the hood opening to the dash opening.

7. In a motor vehicle, in combination, a dash having an opening to the interior of the vehicle body, a hood over the motor pivoted and removable to give access to the motor, and a conduit mounted on the hood and adapted to receive air from outside thereof and deliver it to the opening in the vehicle dash.

In testimony whereof I affix my signature.

JACOB HAMMERL.